United States Patent
Krishnan

(10) Patent No.: US 7,908,431 B2
(45) Date of Patent: *Mar. 15, 2011

(54) METHOD OF PERFORMING TABLE LOOKUP OPERATION WITH TABLE INDEX THAT EXCEEDS CAM KEY SIZE

(75) Inventor: Ram Krishnan, Sunnyvale, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/489,034

(22) Filed: Jun. 22, 2009

(65) Prior Publication Data
US 2009/0259811 A1   Oct. 15, 2009

Related U.S. Application Data

(63) Continuation of application No. 11/397,491, filed on Apr. 3, 2006, now Pat. No. 7,552,275.

(51) Int. Cl.
*G06F 12/00* (2006.01)
(52) U.S. Cl. ......... 711/108; 709/238
(58) Field of Classification Search ......... 711/104, 711/108, 205, 206; 365/49.1; 709/238
See application file for complete search history.

(56) References Cited

U.S. PATENT DOCUMENTS

| 7,003,625 | B2 | 2/2006 | King | |
| 7,266,117 | B1 * | 9/2007 | Davis | 370/363 |
| 2003/0223421 | A1 | 12/2003 | Rich et al. | |
| 2004/0052133 | A1 * | 3/2004 | Yiu et al. | 365/202 |
| 2005/0114337 | A1 | 5/2005 | Lunteren | |
| 2006/0069857 | A1 * | 3/2006 | Lekatsas et al. | 711/108 |
| 2007/0280258 | A1 | 12/2007 | Rajagopalan et al. | |
| 2009/0043956 | A1 * | 2/2009 | Ford | 711/108 |

OTHER PUBLICATIONS

International Search Report & Written Opinion for PCT Application No. PCT/US2007/064433 Mailed Aug. 16, 2007, 15 Pages.
International Preliminary Report on Patentability for PCT Application No. PCT/US2007/064433 Mailed Oct. 16, 2008, 9 Pages.
Non-Final Office Action for European Application No. 07758934.9 Mailed Jan. 23, 2009, 5 Pages.
Non-Final Office Action for European Application No. 07758934.9 Mailed Feb. 23, 2010, 3 Pages.
Non-Final Office Action for U.S. Appl. No. 11/397,491 Mailed Dec. 28, 2007, 10 Pages.
Final Office Action for U.S. Appl. No. 11/397,491 Mailed Sep. 17, 2008, 7 Pages.
Notice of Allowance and Fees for U.S. Appl. No. 11/397,491 Mailed Feb. 10, 2009, 9 Pages.

(Continued)

*Primary Examiner* — Jared I Rutz
(74) *Attorney, Agent, or Firm* — Blakely Sokoloff Taylor & Zafman LLP

(57) ABSTRACT

In a packet switching device or system, such as a router, switch, combination router/switch, or component thereof, a method of and system for performing a table lookup operation using a lookup table index that exceeds a CAM key size is provided. Multiple CAM accesses are performed, each using a CAM key derived from a subset of lookup table index, resulting in one or more CAM entries. One or more matching table entries are derived from the one or more CAM entries resulting from the multiple CAM accesses.

33 Claims, 5 Drawing Sheets

OTHER PUBLICATIONS

Huang, Nen-Fu, et al., "Design of Multi-field IPv6 Packet Classifiers Using Ternary CAMs", Globecom '01, 2001 IEEE Global Telecommunications Conference, San Antonio, TX, Nov. 25-29, 2001, IEEE Global Telecommunications Conference, New York, NY: IEEE, US, vol. vol.3 of 6, Nov. 25, 2001, XP001054898 ISBN:0-7803-7206-9, 5 Pages.

Kounavis, Michael E., et al., "Directions in Packet Classification for Network Processors", Workshop on Network Processors, XX,XX, Feb. 2003, XP002333340, 10 Pages.

Lakshman, et al., "High-speed policy-based packet forwarding using efficient multidimensional range matching", Computer Communication Review, acm sigcomm, vol. 28, No. 4, (Oct. 1998), 12 pages.

Pagiamtzis, Kostas et al., "Content-Addressable Memory (CAM) Circuits and Architectures: A Tutorial and Survey", IEEE Journal of Solid-State Circuits, vol. 41, No. 3, Mar. 2006, 16 Pages.

Taylor, David E., "Survey & Taxonomy of Packet Classification Techniques", Technical Report Department of Computer Science and Engineering University of Washington, XX, XX, No. WUCSE-2004-24, May 10, 2004, XP002401888, 42 pages.

* cited by examiner

| ACL | Source IP | Dst IP | Source Port | Dst Port | Protocol |
|---|---|---|---|---|---|
| 1 | 20/40 | all | all | 80 | TCP |
| 2 | all | 30.1/96 | 10-50 | 22 | UDP |
| 3 | 40.2/128 | 30.1/104 | all | 20-90 | UDP |
| 4 | 20.1.1/120 | 60.1.1/128 | 40 | all | TCP |
108 → 1, 104 → 2, 102 → 3, 106 → 4
FIG. 1
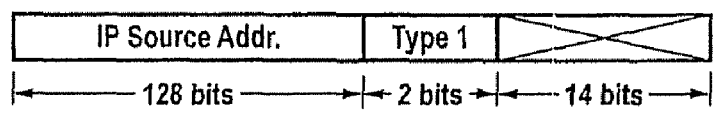
FIG. 2A
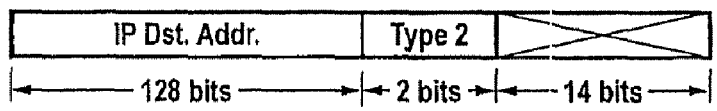
FIG. 2B
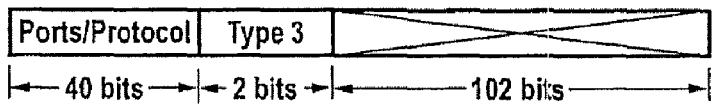
FIG. 2C
| | Key Portion | | Content Portion |
|---|---|---|---|
| CAM Index | Source IP | Type | Bitmap |
| 0 | 40.2/128 | 1 | 0110 |
| 1 | 20.1.1/120 | 1 | 0101 |
| 2 | 20/40 | 1 | 1100 |
| 3 | all | 1 | 0100 |
302 → 0, 304 → 1, 306 → 3
FIG. 3

|  | Key Portion | | Content Portion |
| --- | --- | --- | --- |
| CAM Index | Dst IP | Type | Bitmap |
| 0 | 60.1.1/128 | 2 | 1001 |
| 1 | 30.1/104 | 2 | 1110 |
| 2 | 30.1/96 | 2 | 1100 |
| 3 | all | 2 | 1000 |

|  | Key Portion | | | | Content Portion |
| --- | --- | --- | --- | --- | --- |
| CAM Index | Source Port | Dst Port | Protocol | Type | Bitmap |
| 0 | 10-50 | 22 | UDP | 3 | 0110 |
| 1 | all | 20-90 | UDP | 3 | 0010 |
| 2 | 40 | 80 | TCP | 3 | 1001 |
| 3 | all | 80 | TCP | 3 | 1000 |
| 4 | 40 | all | TCP | 3 | 0001 |

|  | Key Portion | | Content Portion |
|---|---|---|---|
| CAM Index | Source IP | Type | ACL Type Indicator(s) |
| 0 | 40.2/128 | 1 | 2, 3 |
| 1 | 20.1.1/120 | 1 | 2, 4 |
| 2 | 20/40 | 1 | 1, 2 |
| 3 | all | 1 | 2 |

702 → row 0; 704 → row 3

*FIG. 7*

|  | Key Portion | | Content Portion |
|---|---|---|---|
| CAM Index | Dst IP | Type | ACL Type Indicator(s) |
| 0 | 60.1.1/128 | 2 | 1, 4 |
| 1 | 30.1/104 | 2 | 1, 2, 3 |
| 2 | 30.1/96 | 2 | 1, 2 |
| 3 | all | 2 | 1 |

802 → row 0; 804 → row 3

*FIG. 8*

|  | Key Portion | | | | Content Portion |
|---|---|---|---|---|---|
| CAM Index | Source Port | Dst Port | Protocol | Type | ACL Type Indicator(s) |
| 0 | 10–50 | 22 | UDP | 3 | 2, 3 |
| 1 | all | 20–90 | UDP | 3 | 3 |
| 2 | 40 | 80 | TCP | 3 | 1, 4 |
| 3 | all | 80 | TCP | 3 | 1 |
| 4 | 40 | all | TCP | 3 | 4 |

902 → row 2; 904 → row 3; 906 → row 4

*FIG. 9*

METHOD OF PERFORMING TABLE LOOKUP OPERATION WITH TABLE INDEX THAT EXCEEDS CAM KEY SIZE

This application is a continuation of U.S. patent application Ser. No. 11/397,491 ("the '491 application), filed Apr. 3, 2006, which is scheduled to issue Jun. 23, 2009 as U.S. Pat. No. 7,552,275. The '491 application is hereby incorporated herein by reference in its entirety as though set forth in full.

BACKGROUND OF THE INVENTION

1. Field of the Invention

This application relates generally to packet switching devices or systems, e.g., routers, switches, combination routers/switches, components thereof, etc., and, specifically, to methods in such devices or systems of performing table lookup operations through accesses to content addressable memories ("CAMs").

2. Related Art

Content addressable memories ("CAMs") are a convenient mechanism for performing table lookup operations in packet switching devices or systems such as routers, switches and combination routers/switches. Such table lookup operations are useful, for example, in making packet classification and forwarding decisions at high speed. In performing these table lookup operations, the device or system typically derives a table lookup index from one or more packet fields, and inputs that index to a CAM system, i.e., typically a CAM and an associated RAM, having a plurality of entries, each having a key portion and a content portion. In response, the CAM system returns one or more matching entries, i.e., entries having a key portion that matches the inputted table index. The packet classification and forwarding decision for the packet is then made responsive to the content portion of the one or more matching entries.

A problem arises when the size of the table lookup index exceeds the maximum size of the key that is input to the CAM system. Such a problem is likely to arise, for example, in IPv6 compliant packet switching devices or systems where it is desirable to make forwarding and classification decisions based on the combination of certain packet fields, e.g., IP source address, IP destination address, etc., that together have a size that exceeds the maximum desirable key size, e.g., 144 bits, of available ternary (or binary) CAMs that are cost effective for the application. This problem is particularly likely to arise in IPv6 compliant devices or systems because of the increased size of the IP source and address fields (128 bits) compared to that in IPv4 complaint devices or systems (32 bits). In such applications, more expensive CAMs having a larger key size, e.g., 576 bits, can be used to accommodate the desired table index size, but only at the expense of increased system cost.

SUMMARY

The invention provides a method, in a packet switching device or system, of performing a table lookup operation using a table lookup index that exceeds maximum desirable CAM key size. In this method, the table lookup operation is performed through multiple CAM accesses to one or more CAM systems, in which each CAM access is performed using a CAM key that is less than or equal to the maximum allowable CAM key size. One or more matching lookup table entries are derived from the one or more matching CAM entries resulting from the one or more CAM accesses.

In one embodiment, a first CAM access to a first CAM system is performed, using a first CAM key derived from a subset of the table lookup index, resulting in one or more first CAM entries. A second CAM access to a second CAM system is also performed, using a second CAM key derived from a subset of the table lookup index, resulting in one or more second CAM entries. The first and second CAM systems may be the same system or distinct systems. The one or more matching lookup table entries are determined responsive to the one or more first CAM entries and the one or more second CAM entries.

In one implementation, each CAM entry includes a bit map indicating one or more potential lookup table matches. In this implementation, the bit maps from the one or more matching CAM entries resulting from the one or more CAM accesses are logically combined, forming a composite bit map indicating the one or more matching lookup table entries.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 1 is an example of a lookup table indicating forwarding decisions for an IPv6 compliant packet, wherein the table index is the combination of the IPv6 source IP address, destination IP address, source port, destination port, and protocol fields of a packet.

FIGS. 2a, 2b, and 2c are possible formats of the CAM keys for the first, second, and third type of CAM entries illustrated, respectively, in FIGS. 3-5.

FIG. 3 is an example of CAM entries of a first type derived from the lookup table of FIG. 1, wherein the CAM key for these entries is the IPv6 source IP address.

FIGS. 7-9 are examples of CAM entries of first, second and third types, respectively, wherein the content portion is an indicator of ACL type(s) rather than a bit map.

DETAILED DESCRIPTION

Figures 4, 5, 6:
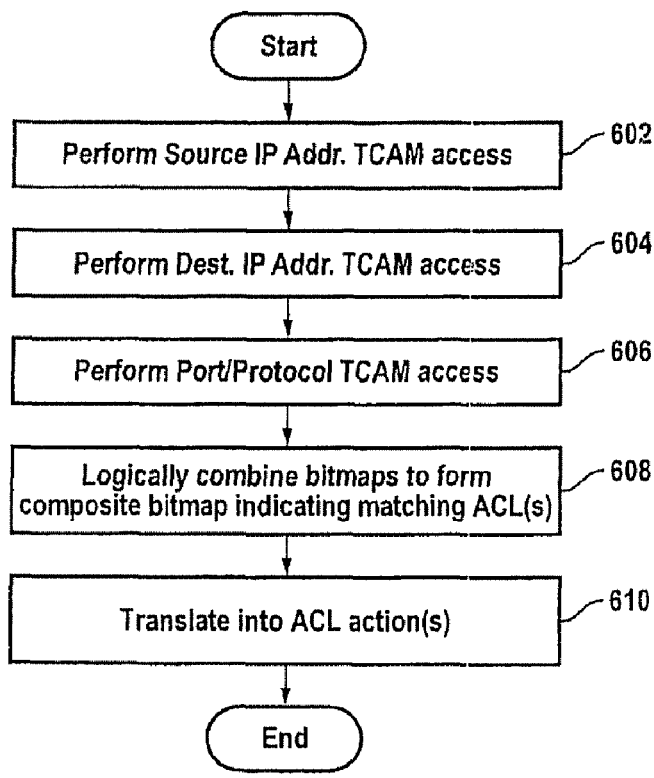
FIG. 4 is an example of CAM entries of a second type derived from the lookup table of FIG. 1, wherein the CAM key for these entries is the IPv6 destination IP address.
FIG. 5 is an example of CAM entries of a third type derived from the lookup table of FIG. 1, wherein the CAM key for these entries is the IPv6 source port, destination port and protocol.
FIG. 6 is a flowchart of a method of making a forwarding decision for a packet in a packet switching device or system compliant with the IPv6 protocol through multiple CAM accesses, wherein each CAM access yields a bitmap, and the bitmaps from each of the CAM accesses are logically combined to form a composite bitmap indicating possible forwarding decisions for the packet.

FIG. 1 illustrates an example of a lookup table for use by a packet switching device or system, e.g., router, switch, combination router/switch, component thereof, etc., in making a forwarding and/or classification decision for an IPv6 compliant packet. At the outset, however, it should be understood that the invention is not limited to the specific contexts of making a classification/forwarding decision for an IPv6 compliant packet, but is generally applicable to any lookup table operation where the table index used to identify matching entries is larger than the maximum desirable CAM key size. In the particular example illustrated in FIG. 1, the packet forwarding/classification decision is based on the combination of the IP source address, IP destination address, source port, destination port, and protocol fields from the packet, which together form a 296 bit index to the lookup table. The Access Control List ("ACL") type for a matching entry in the table represents the packet forwarding/classification decision for the packet. In this particular example, some of the possible ACL types include route, drop, CPU copy, redirect, learn, egress mirror, ingress mirror, etc., which, in one particular example, are defined as follows:

"route" indicates that the packet is being bridged not routed, and that devices encountering the packet should therefore implement an echo kill suppress function.

"drop" indicates that devices encountering the packet should drop it.

"CPU copy" directs the device to forward a copy of the packet to a CPU host coupled to the device.

"redirect" directs the device to forward a copy of the packet to the CPU host for redirect processing. In redirect processing, the host receives the packet copy and redirects it to the sender, with an indication that the sender should switch the packet, not route it.

"learn" directs the device to forward a copy of the packet to the CPU host so the host can perform learn processing. In learn processing, the host analyzes the packet to "learn" the sender's MAC address for future packet switching of packets to that address.

"egress mirror" directs the device to send a copy of the network egress form of the packet to the portion of the device following the packet/forwarding classification portion.

"ingress mirror" directs the device to forward a copy of the packet to a designated ingress mirror port on the device.

In FIG. 1, these possible packet forwarding/classification decisions are referred to as ACL 1, ACL 2, ACL 3, etc.

Subsets of the individual index fields may be specified for matching. For example, in FIG. 1, the designation "30.1/104" for the destination IP address field in the third table entry 102 indicates that the first (most significant) 104 bits of the destination IP address of the packet must start with 30.1 and be followed by trailing zeroes, i.e., equal 3001:0000:0000:0000:0000:0000.00/104 (equivalently, 3001:0:0:0:0:0:0/104, using a shorthand notation of ":0" for trailing zeroes (typically four) in hexadecimal) in hexadecimal, for there to be a match, and the designation "20.1.1/120" for the source IP address field in the fourth table entry 106 indicates that the first 120 bits of the source IP address of the packet must start with 20.1.1 and be followed by trailing zeroes, i.e., equal 2001:0100:0000:0000:0000:0000:0000:00/120 (equivalently 2001:0100:0:0:0:0:0:0/120) in hexadecimal, for there to be a match.

Additionally, wildcard matches are supported. For example, the designation "all" for the source port field in the first table entry 108 of FIG. 1 indicates there will be a match with any source port identified in the packet. Similarly, the designation "all" for the source IP address in the second table entry 104 indicates there will be a match with any source IP address identified in the packet.

Multiple matches are also possible. In fact, multiple matches are very useful for certain applications, for example, malicious traffic identification or other applications involving security. In applications such as this, a single CAM entry may not represent all the desired ACL actions, and it may be necessary to consult multiple entries to determine all possible ACL actions.

To handle multiple matches, a priority resolution scheme may be necessary. For example, a packet identifying "40.2" as the source IP address, "30.1" as the first 104 bits of the destination IP address, "45" as the source port, "22" as the destination port, and "UDP" as the protocol, will match both the second and third entries 102, 104 of FIG. 1. To resolve this potential ambiguity, a priority convention may be adopted whereby lower numbered matching entries are given priority over higher numbered matching entries, although it should be appreciated that other conventions are possible, such as giving higher numbered matching entries priority over lower numbered matching entries. Applying this convention to the previous example, the second entry 104 is given priority over the third 102, and the forwarding/classification decision for the packet taken to be ACL 2.

The lookup table index used to identify matching table entries in this particular example is the combination of IP source address, IP destination address, source port, destination port, and protocol, although it should be appreciated that other examples of table indices are possible, based on other fields or combinations of fields, both within and outside the packet switching context. In IPv6, because the IP source and destination addresses are each 128 bits, the source and destination ports are each 16 bits, and the protocol is 8 bits, the total size of this index in this particular example is 296 bits. If additional fields, such as the ToS field and TCP flags field, are included, the size can increase to around 320 bits.

Because ternary CAMs ("TCAMs") currently come in widths of 72, 144, 288 and 576 bits, the table index only fits within the 576 bit width. However, as 576 bit TCAMs are expensive and not commonly used, use of such TCAMs is not desirable in this particular application. Instead, a more popular and less expensive TCAM, such as the 144 bit variety, is selected. To fit within the 144 TCAM key size, the lookup table index is split into three sub-keys, each less than 144 bits, and one or more TCAMs populated with entries that are subsets and, in some cases, combinations, of the table entries of FIG. 1.

In a first implementation, a single CAM system is used, comprising a 144-bit TCAM and an associated RAM. In this particular implementation, the TCAM has a plurality of 144 bit entries, each bit of which can take on values of logical "1," "0," or don't care. As explained in Pagiamtzis, K. et al., Content-Addressable Memory (CAM) Circuits and Architectures: A Tutorial and Survey, IEEE journal of Solid-State Circuits, Vol. 41, No. 3, March 2006, pp. 712-727, which is incorporated herein by reference as though set forth in full, each entry has a matchline indicating whether or not the inputted 144 bit CAM key matches the entry. The matchlines for all the entries are input to an encoder (inherent part of the TCAM), which generates a binary match location indicating the address of the matching entry. In applications where more than one match is expected or possible, a priority encoder is used, which selects the highest priority matching entry, and outputs its address. The priority encoder can be configured to give the highest priority to the first or last matching entries. A hit signal is often included to signal the situation in which no matching entry is located in the CAM. The address of the matching entry is input to the associated RAM, which outputs the contents of a corresponding RAM entry. Together, the CAM entry and the associated RAM entry may be considered respectively as the key portion and the content portion of the same CAM system entry.

In this implementation, the table lookup key of FIG. 1 is split into three sub-indices, each a CAM key less than or equal to 144 bits, with a type field added to differentiate the three key formats from one another. FIG. 2a illustrates the first CAM key format, comprising the 128 bit source IP address and a 2-bit type field indicating type one; FIG. 2b, the second CAM key format, comprising the 128 bit destination IP address and a 2-bit type field indicating type two; and FIG. 2c, the third CAM key format, comprising a 40 bit field holding the source and destination ports, the protocol, and a 2-bit type field indicating type three.

The table entries of FIG. 1 are similarly split into three types of CAM entries, with a type field being used to differentiate between the three types. FIG. 3 illustrates the first type of CAM entry; FIG. 4, the second; and FIG. 5, the third. Referring to FIG. 3, the CAM Index field indicates the relative order in which the entries are stored in the CAM system, and hence the relative priority of these entries, but is not physically stored as part of these entries. The key portion of each entry is the combination of the source IP address and the type field. The content portion of each entry is a bitmap field indicating the ACL matches associated with the entry.

The CAM entries in FIG. 3, which are advantageously arranged in a longest match first order, are derived from the table entries of FIG. 1 as follows. The table entry with the most exacting specification for the source IP address, i.e., the third entry 102 specifying that the 128 bit source IP address start with "40.2" and be followed by trailing zeroes, i.e., equal 4002:0:0:0:0:0:0:0/128, is selected. Any other table entry whose source IP address specification matches this particular specification is also selected, i.e., the second entry 104 specifying "all" for the source IP address. The source IP specification from entry 102 in FIG. 1, together with a type field indicating type one, form the key portion of the first CAM entry 302 in FIG. 3. The content portion of the CAM entry 302 is a bitmap indicating the ACL types, i.e., types 2 and 3, for the two matching table entries 102 and 104 of FIG. 1. In this particular implementation, the bitmap has a bit for each of the possible ACL types, with the left-to-right order of the bit indicating the ACL type associated with the bit. According to one convention, if the ACL type associated with a bit is represented in one of the matching table entries, then the bit is set to a logical "1," otherwise, it is cleared to a logical "0," although it should be appreciated that other conventions are possible, for example, the convention whereby matching ACL types are represented in the composite bitmap with a logical "0" rather than a logical "1." Thus, in FIG. 3, the bitmap for entry 302 is "0110," indicating matches with ACL types 2 and 3.

The next CAM entry 304 in FIG. 3 is constructed by selecting the table entry in FIG. 1 with the next most exacting specification for source IP address, i.e., the fourth entry 106, specifying that the first 120 bits of the source IP address must start with "20.1.1" and be followed by trailing zeroes, i.e., equal 2001:0100:0:0:0:0:0:0/120, for there to be a match. Any other table entry whose source IP address specification is necessarily satisfied by this specification is also selected, for example, entry 104, specifying a match with any source IP address. Based on these entries, the key portion of CAM entry 304 is set the source IP specification from entry 106 followed by a type field indicating type one. The content portion of entry 304 is set to the bit map 0101, to indicate matching ACL types 2 and 4, the ACL types specified by entries 106 and 104 in FIG. 1. The remaining CAM entries are constructed in like manner.

Referring to FIG. 4, as with FIG. 3, the CAM Index field indicates the relative order in which the second category of entries are stored in the CAM system, and hence the relative priority of these entries, but is not physically stored as part of these entries. The key portion of each entry is the combination of the destination IP address and the type field. The content portion of each entry is a bitmap field indicating the ACL matches associated with the entry.

The CAM entries in FIG. 4, also advantageously arranged in longest match first order, are derived from the table entries of FIG. 1 as follows. The table entry with the most exacting specification for the destination IP address, i.e., the fourth entry 106 specifying that the 128 bit destination IP address start with "60.1.1" and be followed by trailing zeroes, i.e., equal 6001:0100:0:0:0:0:0:0/128, is selected. Any other table entry whose destination IP address specification matches this particular specification is also selected, i.e., the first entry 108 specifying "all" for the destination IP address. The destination IP address specification from entry 106 in FIG. 1, together with a type field indicating type two, form the key portion of the first CAM entry 402 in FIG. 4. The content portion of the CAM entry 402 is a bitmap indicating the ACL types, i.e., types 1 and 4, for the two matching table entries 106 and 108 of FIG. 1.

The next CAM entry 404 in FIG. 4 is constructed by selecting the table entry in FIG. 1 with the next most exacting specification for destination IP address, i.e., the third entry 102, specifying that the first 104 bits of the destination IP address must start with "30.1" and be followed by trailing zeroes, i.e., equal 3001:0:0:0:0:0:0/96, for there to be a match. Any other table entry whose destination IP address specification is necessarily satisfied by this specification is also selected, for example, entry 104, specifying that the first 96 bits of the destination IP address start with "30.1" and be followed by trailing zeroes, i.e., equal 3001:0000:0000:0000:0000:0000/96 (equivalently, 3001:0:0:0:0:0:0/96), and entry 108, specifying a match with any destination IP address. Based on these entries, the key portion of CAM entry 404 is set the destination IP specification from entry 102 followed by a type field indicating type two. The content portion of entry 404 is set to the bit map 1110, to indicate matching ACL types 1, 2, and 3, the ACL types specified by entries 102, 104 and 108 in FIG. 1. The remaining CAM entries in FIG. 4 are constructed in like manner.

Referring to FIG. 5, as with FIGS. 3-4, the CAM Index field indicates the relative order in which the entries are stored in the CAM system, and hence the relative priority of these entries, but is not physically stored as part of these entries. The key portion of each entry is the combination of the source port, destination port, protocol, and the type field. The content portion of each entry is a bitmap field indicating the ACL matches associated with the entry.

The CAM entries in FIG. 5, also advantageously arranged in longest match first order, are derived from the table entries of FIG. 1 as follows. The table entry with the most exacting specification for the source port, destination port, and protocol, i.e., the second entry 104 specifying that the source port ranges from 10 to 50, that the destination port is 22, and the protocol is UDP, is selected. Any other table entry whose combined source port, destination port, protocol specification matches this particular specification is also selected, i.e., the third entry 102 specifying "all" for the source IP port, a range of 20 to 90 for the destination port, and UDP for the protocol. The combined source port, destination port, and protocol specification from entry 104 in FIG. 1, together with a type field indicating type three, form the key portion of the first CAM entry 502 in FIG. 5. The content portion of the CAM entry 502 is a bitmap indicating the ACL types, i.e., types 2 and 3, for the two matching table entries 102 and 104 of FIG. 1.

The next CAM entry 504 in FIG. 5 is constructed by selecting the table entry in FIG. 1 with the next most exacting specification for the combined source port, destination port, and protocol, i.e., the third entry 102, specifying that any source port is matching, that the destination port range between 20 and 90, and that the protocol be UDP. Any table entry whose combined source port, destination port, and protocol specification is necessarily satisfied by this specification is also selected, but in this particular case, there are none. Hence, CAM entry 504 is constructed based on entry 102 alone in FIG. 1. Based on this entry, the key portion of CAM entry 504 is set to the combined source port, destination port, and protocol specification from entry 102 followed by a type field indicating type three. The content portion of entry 504 is set to the bit map 0010, to indicate matching ACL type 3, the ACL type specified by entry 102 in FIG. 1.

Entry 506 in FIG. 5 is specially constructed from the combination of entries 106 and 108 in FIG. 1. The purpose of entry 506 is to ensure that a match of this entry is assigned the correct ACL action. For example, consider a packet with 40 as the source port, 80 as the destination port, and TCP as the protocol type. In the absence of entry 506, this packet would match both entries 508 and 510. As the logical AND of the bitmaps for these two entries is 0000, the packet would not be assigned any ACL action, which is incorrect, as the table of FIG. 1 calls for such a packet to be assigned ACL action 1. Entry 506 ensures that this packet is in fact assigned ACL action 1.

The remaining CAM entries in FIG. 5 are constructed in like manner to entries 502 and 504.

Each of the entries illustrated in FIGS. 3-5 may be stored in the same CAM system or different CAM systems. The use of a single CAM system for storing all types of entries is efficient and cost-effective, although it requires additional overhead in the form of a type field that must be added to the CAM keys and key portion of CAM entries in order to differentiate between the different types. A partitioned approach, where each type of CAM entry is stored in a different CAM system, avoids the need for a type field in the CAM keys and the key portion of the CAM entries. Partitioning does, however, require multiple CAM systems and the overhead of inputting different CAM keys to different ones of the CAM systems.

Moreover, the entries illustrated in FIGS. 3-5 may be arranged in other than longest match first order. For example, with no different in result, the entries in FIGS. 3-5 could be arranged in shortest match first order, and the priority resolution scheme changed to give priority to bottom-most entries rather than top-most entries.

A table lookup operation in an implementation where the same or different CAM systems are used to hold the CAM entries proceeds in several steps, illustrated in FIG. 6. In step 602, a first CAM access is performed using a CAM key based on the source IP address from the packet. In the case where all accesses are made to the same CAM system, the access is made using the first type of CAM key illustrated in FIG. 2a, i.e., a CAM key based on the IP source address and the key type. Assuming the packet that is being considered has a source IP address of "20.1.1.0 . . . " (2001:0100 . . . in hexadecimal), the result of this first CAM access is a match with entry 304. (Although there is also a match with entry 306, after application of the priority resolution scheme, only entry 304 is assumed returned). The bit map in entry 304 resulting from this access, i.e., 0101, indicates matches with ACL types 2 and 4.

In the case where different CAM systems are used to hold the different entry types, the first CAM access is performed in a first CAM system holding just the entries of the first type. In this case, the CAM key may have the format illustrated in FIG. 2a, with the type field eliminated, and the CAM entries may have the format illustrated in FIG. 3, again, with the type field eliminated.

In step 604, a second CAM access is performed using a CAM key based on the destination IP address from the packet. In the case where all CAM accesses are made to the same CAM system, the access is made using the second type of CAM key illustrated in FIG. 2b, i.e., a CAM key based on the IP destination address and key type. Assuming the packet under consideration has a destination IP address of "60.1.1.0 . . . " (6001.0100 . . . in hexadecimal), the result of this second access is a match with entry 402. (Again, although there is also a match with entry 406, after application of the priority resolution scheme, it is assumed that only entry 402 is returned). The bit map in entry 402 resulting from this access, i.e., 1001, indicates matches with ACL types 1 and 4.

In the case where different CAM systems are used to hold the different entry types, the second CAM access is performed in a second CAM system holding just the entries of the second type. In this case, the CAM key may have the format illustrated in FIG. 2b, with the type field eliminated, and the CAM entries may have the format illustrated in FIG. 4, again, with the type field eliminated.

In step 606, a third CAM access is performed used a CAM key based on the source port, destination port, and protocol fields from the packet. In the case where all accesses are made to the same CAM system, the third CAM access is made with a key having the format illustrated in FIG. 2c, i.e., a CAM key based on the combination of source port, destination port, protocol and key type. Assuming the packet under consideration has a source port of 40, a destination port of 80, and the TCP protocol, the result of this third access is a match with entry 506. (Again, although there will also be matches with entries 508 and 510, after application of the priority resolution scheme, it is assumed that only entry 506 is returned). The bit map resulting from this access, i.e., 1001, indicates matches with ACL types 1 and 4.

In the case where different CAM systems are used to hold the different entry types, the third CAM access is performed in a third CAM system holding just the entries of the third type. In this case, the CAM key may have the format illustrated in FIG. 2c, with the type field eliminated, and the CAM entries may have the format illustrated in FIG. 5, again, with the type field eliminated.

In step 608, the three bit maps from the three accesses, i.e., 0101, 1001, 1001, are logically combined, e.g., ANDed, together to yield a composite bit map of 0001, indicating a match with ACL type 4 only. That is the correct result as entry 106 in FIG. 1, which identifies ACL type 4, is the only matching entry to the table index for the packet in question. Thus, it can be seen that the table lookup operation was correctly performed using three CAM accesses, each access using a CAM key derived from a subset of the lookup table index, and having a size less than or equal to the maximum desirable CAM key size.

In step 610, the composite bit map is then translated into an ACL action (or ACL actions) for the packet. For example, the composite bit map may be used as an index to a memory holding an array of possible ACL actions. The memory may be separate from the ARAM(s) holding the CAM entries. The array is advantageously configured to receive the composite bitmap and retrieve, for each of the logical "1"s in the bitmap, the ACL action corresponding to that logical "1." In the case where a matching ACL type is indicated by a logical "0" rather than a logical "1," the array is configured to retrieve, for each of the logical "0"s in the bitmap, the ACL action corresponding to that logical "0."

If multiple ACL actions are retrieved, such as would occur when there is more than one logical "1" in the composite bitmap, a priority resolution scheme may be applied to resolve the potential ambiguity and return one ACL action for the packet. For example, a scheme that gives priority to lower numbered ACL actions compared to higher numbered ACL actions, e.g., gives priority to ACL 2 over ACL 4, might be adopted. Alternatively, a scheme that gives priority to higher numbered ACL actions over lower numbered ACL actions, e.g., gives priority to ACL 4 over ACL 2, could be utilized.

In applications involving a large number of possible ACL types, the length of the bitmap for each of the CAM entries would be large, potentially resulting in inefficient memory utilization and slow memory access times. A characteristic of these bitmaps is they tend to be sparse in nature since the number of ACL matches represented in each tends to be quite few. In such applications, it may be more efficient to store an ordered set of entries for each type of access, where the content portion of each entry is an indicator of one or more ACL type(s), advantageously stored in compressed form, rather than a bit map representing one or more ACL types. For example, a compressed indicator of ACL type 2 might simply be the numeral 2 in contrast to a bitmap, i.e., 0100, indicating ACL type 2. As another example, a compressed indicator of ACL types 2 and 4 could simply be the concatenation of numerals 2 and 4 rather than a bitmap, i.e., 0101, indicating ACL types 2 and 4. Each CAM access in such applications may result in one or more matching entries. Once these entries have been retrieved, a bit map is generated "on the fly" from the matched entries. Each of the CAM accesses proceeds in like manner, and, when all CAM accesses have been performed, the generated bit maps are logically combined to form a composite bit map in like manner to that previously described.

Figure 10:
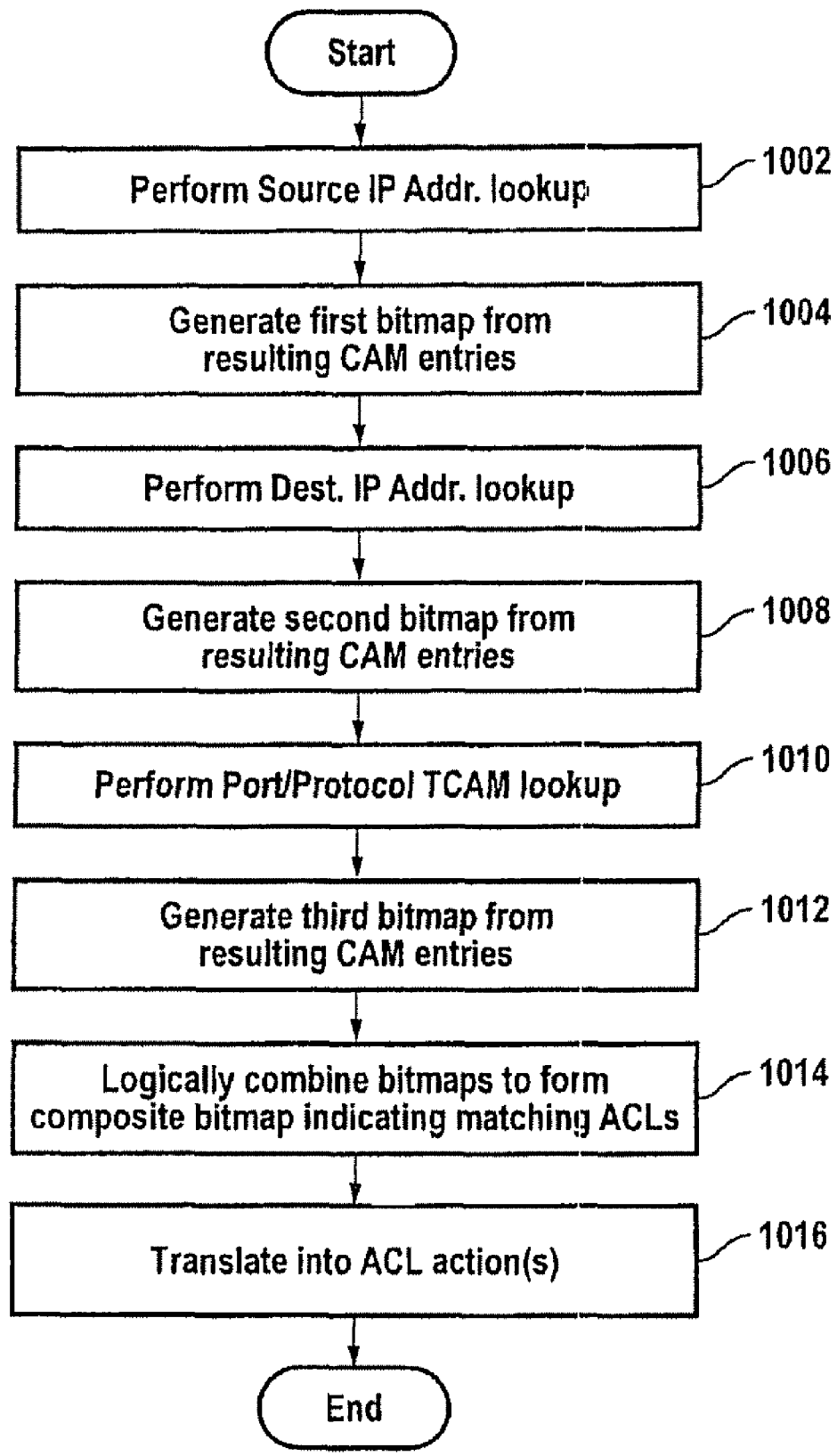
FIG. 10 is a flowchart of a method of making a classification/forwarding decision for a packet in a packet switching device or system compliant with the IPv6 protocol through multiple CAM accesses, where a bitmap is generated on the fly from each of the CAM entries resulting from a CAM access, and the bitmaps generated following each of the CAM accesses are logically combined to form a composite bitmap indicating possible forwarding decisions for the packet.

A table lookup operation in an implementation where bit maps are generated "on the fly" proceeds in several steps, illustrated in FIG. 10. For brevity of explanation, it is assumed that all entries are stored in the same CAM system, but it should be appreciated that "on the fly" implementations and embodiments are possible wherein different types of CAM entries are stored in different CAM systems, as previously described.

In "on the fly" bitmap generation, the CAM entries differ from those illustrated in FIGS. 3-5, and instead follow the formats illustrated in FIGS. 7-9, respectively. More specifically, the first type of entry is illustrated in FIG. 7. Note these entries are generated from the lookup table entries of FIG. 1 by populating the content portion of the entry with an indicator of one or more ACL types or actions, advantageously in compressed form, and designating the source IP address and type as the key portion of the entry. As before, the CAM index field in not physically stored with an entry, but merely indicates the relative order in which the entries are stored in a CAM system. The result is a table similar to that in FIG. 3 except that the content portion of each entry is populated with ACL type indicator(s), advantageously in compressed form, rather than bit maps.

The second type of entry is illustrated in FIG. 8. Note these entries are generated from the lookup table entries of FIG. 1 by populating the content portion of the entry with one or more indicators of ACL types or actions, advantageously in compressed form, and designating the destination IP address and type as the key portion of the entry. As before, the CAM index field in not physically stored with an entry, but merely indicates the relative order in which the entries are stored in a CAM system. The result is a table similar to that in FIG. 4 except that the content portion of each entry is populated with ACL type indicator(s), advantageously in compressed form, rather than bit maps.

The third type of entry is illustrated in FIG. 9. Note these entries are generated from the lookup table entries of FIG. 1 by populating the content portion of the entry with one or more indicators of ACL types or actions, advantageously in compressed form, and designating the combination of the source port, destination port, protocol, and type as the key portion of the entry. As before, the CAM index field in not physically stored with an entry, but merely indicates the relative order in which the entries are stored in a CAM system. The result is a table similar to that in FIG. 5 except that the content portion of each entry is populated with ACL type indicator(s), advantageously in compressed form, rather than bit maps.

Turning to FIG. 10, in step 1002, a first CAM access is performed using the first type of CAM key illustrated in FIG. 2a, i.e., a CAM key based on the IP source address and the key type. Assuming the packet that is being considered has a source IP address of "20.1.1.0 . . . ," the result of this first CAM access is a match with entry 702 in FIG. 7. (Although entry 704 also matches, after application of the priority resolution scheme, it is assumed that only entry 702 is returned).

In step 1004, a bit map is generated on the fly from the ACL type indicators, i.e., ACL types 2 and 4, held by the matching entry, i.e., entry 702, resulting from this access. The bit map that is generated, i.e., 0101, indicates matches with ACL types 2 and 4.

In step 1006, a second CAM access is performed using the second type of CAM key illustrated in FIG. 2b, i.e., a CAM key based on the IP destination address and key type:

Assuming the packet under consideration has a destination IP address of "60.1.10 . . . ," the result of this second access is a match with entry 802 in FIG. 8. (Although entry 804 also matches, it is assumed that, after application of the priority resolution scheme, only entry 802 is returned).

In step 1008, a bit map is generated, i.e., 1001, representing the match with entry 802, holding indicators for ACL types 1 and 4.

In step 1010, a third CAM access is performed with a key having the format illustrated in FIG. 2c, i.e., a CAM key based on the combination of source port, destination port, protocol and key type. Assuming the packet under consideration has a source port of 40, a destination port of 80, and the TCP protocol, the result of this third access is a match with entry 902 in FIG. 9. (Although entries 904 and 906 also match, after application of the priority resolution scheme, it is assumed that only entry 902 is returned).

In step 1012, a bit map is generated, i.e., 1001, resulting from the match with entry 902 holding indicators of ACL types 1 and 4.

In step 1014, the three bit maps from the three accesses, i.e., 0101, 1001, 1001, are logically combined, e.g.; ANDed, together to yield a composite bit map of 0001, indicating a match with ACL type 4 only. Again, that is the correct result as entry 106 in FIG. 1, which identifies ACL type 4, is the only matching entry to the table index for the packet in question. Thus, it can be seen that the table lookup operation was correctly performed using three CAM accesses, each access using a CAM key derived from a subset of the lookup table index, and having a size less than or equal to the maximum desirable CAM key size.

In step 1016, similar to step 610 in FIG. 6, the composite bit map is then translated into an ACL action (or ACL actions) for the packet. For example, the composite bit map may be used as an index to a memory holding an array of possible ACL actions, which memory may be separate from the ARAM(s) holding the CAM entries. The array is advantageously configured to receive the composite bitmap and retrieve, for each of the logical "1"s in the bitmap, the ACL action corresponding to that logical "1." In the case where a matching ACL type is indicated by a logical "0" rather than a logical "1," the array is configured to retrieve, for each of the logical "0"s in the bitmap, the ACL action corresponding to that logical "0."

As in step 610 of FIG. 6, if multiple ACL actions are retrieved, such as would occur when there is more than one logical "1" in the composite bitmap, a priority resolution scheme may be applied to resolve the potential ambiguity and return one ACL action for the packet. For example, a scheme that gives priority to lower numbered ACL actions compared to higher numbered ACL actions, e.g., gives priority to ACL 2 over ACL 4, might be adopted. Alternatively, a scheme that gives priority to higher numbered ACL actions over lower numbered ACL actions, e.g., gives priority to ACL 4 over ACL 2, could be utilized.

Figure 11:
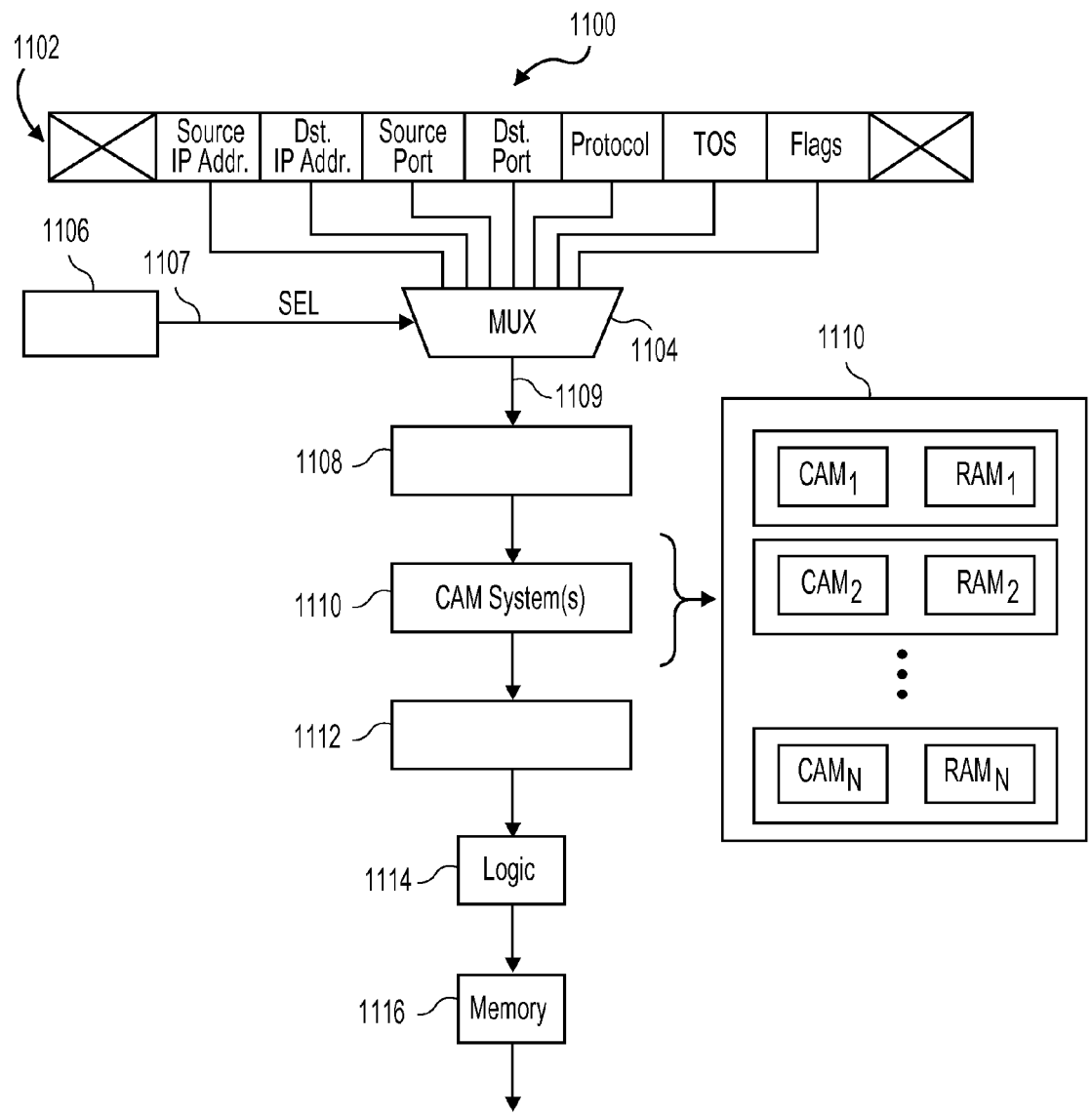
FIG. 11 is a block diagram of a system for performing a lookup table operation through multiple CAM accesses.

A system for performing any of the foregoing methods is illustrated in FIG. 11. A packet for which a classification/forwarding decision is desired is stored in buffer 1102. As illustrated, the packet has a number of fields, i.e., source IP address, destination IP address, source port, destination port, protocol. ToS, TCP flags, etc., each of which is input to data inputs of multiplexor 1104. Controller 1106, for example, a finite state machine, selects a packet field and/or a combination of packet fields through one or more selection signals 1107, which is input to a control input of the multiplexor 1104. In response, the multiplexor 1104 outputs the selected field and/or combination of fields through one or more data outputs 709. The selected field and/or selected combination of fields are stored in buffer 1108. In the case where CAM keys and entries have a type field, the controller 1106 inserts a type field into buffer 1108, and populates it with a type value appropriate for the CAM access in question, i.e., type one, type two, type three, etc.

CAM accesses are performed to one or more CAM systems 1110 under the control of controller 1106. If a single CAM system is provided, the multiple accesses are sequentially performed. If multiple CAM systems are provided, the multiple accesses may be performed in parallel. Any matching CAM entries resulting from the accesses are stored in storage 1112, comprising one or more storage locations for the storage of matching CAM entries. Storage 1112 may provide storage for one or more matching CAM entries resulting from a single access, for entries resulting one or more accesses that relate to the same table lookup operation, or entries resulting from one or more accesses relating to different lookup table operations.

In the case where the content portion of the CAM entries provides a bit map representing matching ACL types, logic 1114, which may be implemented as hardware, software, or a combination of hardware and software, is configured to logically combine the bitmaps together, such as through ANDing, resulting in a composite bitmap that indicates the matching one or more ACL types for the overall lookup table operation.

In the case where the content portion of the CAM entries provides the matching ACL type for the entry, and bit maps are generated on the fly, logic 1114 is configured to generate the bit maps on the fly from the matching ACL types. When all such bit maps for the multiple accesses have been generated, logic 1114 is further configured to logically combine the generated bit maps together, again resulting in a composite bit map that indicates the matching one or more ACL types for the overall lookup table operation.

A memory 1116 holding an array of possible ACL actions may be provided in the system. As previously described in relation to FIGS. 6 and 10, the composite bitmap may be used as an index to this memory. In response, the memory is configured to provide all ACL actions corresponding to logical "1"s (or logical "0"s as the case may be) in the composite bit map. If there is more than one corresponding ACL action, a priority resolution scheme may be applied to resolve the potential ambiguity and return one ACL action for the packet in question.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method of making a classification or forwarding decision for a packet comprising:

performing a first content addressable memory (CAM) access to a first CAM system, the first CAM system comprising a CAM and an associated random access memory (RAM), wherein performing the first CAM access is via a first CAM key derived from a first portion of the packet, resulting in one or more first matching entries, each of the one or more first matching entries including a content portion obtainable from the associated RAM of the first CAM system;

performing a second CAM access to a second CAM system, the second CAM system comprising a CAM and an associated RAM, wherein performing the second CAM access is via a second CAM key derived from a second portion of the packet different than the first portion of the packet, resulting in one or more second matching entries, each of the one or more second matching entries including a content portion obtainable from the associated RAM of the second CAM system; and determining the classification or forwarding decision for the packet responsive to the content portion of each of the one or more first and second matching entries, wherein the content portion of each of the one or more first and second matching entries comprises a compressed form of one or more indicators of the one or more classification or forwarding decisions.

2. The method of claim 1, wherein the predetermined content portion of each of the one or more first and second matching entries comprises a bit map.

3. The method of claim 2, wherein the determining comprises logically combining the bit maps for each of the one or more first and second matching entries, resulting in a composite bit map from which the classification or forwarding decision for the packet is derived.

4. The method of claim 3, wherein the determining further comprises applying the composite bit map as an index to a memory holding an array of possible forwarding or classification decisions.

5. The method of claim 4, wherein the determining further comprises applying a priority resolution scheme to the composite bit map.

6. The method of claim 1, wherein the one or more indicators of the one or more classification or forwarding decisions include types indicating route, drop, central processing unit (CPU) copy, redirect, learn, egress minor, and ingress minor.

7. The method of claim 1, wherein the one or more indicators in compressed form represent Access Control List (ACL) types.

8. The method of claim 1, wherein the determining further comprises decompressing the one or more indicators for each of the one or more first and second matching entries.

9. The method of claim 1, wherein the first and the second CAM systems are different.

10. The method of claim 1, wherein the first and the second CAM systems are the same.

11. The method of claim 10, wherein the first and the second CAM keys are of different types.

12. The method of claim 11, wherein the first and the second CAM keys are of different types as indicated by a type field included in each.

13. The method of claim 12, wherein the one or more first matching CAM entries and the one or more second CAM entries are of different types as indicated by a type field in the key portion of each.

14. The method of claim 1 further comprising:
performing one or more additional CAM accesses, to the first, the second, or an additional CAM system, resulting in one or more additional matching CAM entries, each additional matching CAM entry having a content portion retrieved from associated RAM; and
determining the classification or forwarding decision for the packet responsive to the content portion of each of the one or more first, second, and additional matching CAM entries.

15. The method of claim 1, wherein the first CAM key comprises one or more first packet fields, and the second CAM key comprises one or more second packet fields, each distinct from the one or more first packet fields.

16. The method of claim 1, wherein the first and the second CAM keys are each smaller than a maximum allowable CAM key size applicable to the first and the second CAM systems.

17. A system for making a classification or forwarding decision for a packet comprising:
a buffer for storing the packet;
a first logic, coupled to the buffer, for deriving a first content addressable memory (CAM) key from a first portion of the packet and a second CAM key from a second portion of the packet different than the first portion of the packet;
a first CAM system, comprising a CAM and an associated random access memory (RAM), for performing a first CAM access via the first CAM key, resulting in one or more first matching entries, each of the one or more first matching entries including a content portion obtainable from the associated RAM of the first CAM system;
a second CAM system, comprising a CAM and an associated RAM, for performing a second CAM access via the second CAM key, resulting in one or more second matching entries, each of the one or more second matching entries including a content portion obtainable from the associated RAM of the second CAM system; and
a second logic, coupled to the first and the second CAM systems, for determining the classification or forwarding decision for the packet responsive to the content portion of each of the one or more first and second matching entries,
wherein the content portion of each of the one or more first and second matching entries comprises a compressed form of one or more indicators of the one or more classification or forwarding decisions.

18. The system of claim 17, wherein the predetermined content portion of each of the one or more first and second matching entries comprises a bit map.

19. The system of claim 18, wherein the second logic is operable to logically combine the bit maps for each of the one or more first and second matching entries to form a composite bit map, and derives the classification or forwarding decision for the packet from the bit map.

20. The system of claim 18, wherein the second logic is operable to apply the composite bit map as an index to a memory holding an array of possible forwarding or classification decisions.

21. The system of claim 20, wherein the second logic is operable to apply a priority resolution scheme to the composite bit map.

22. The system of claim 17, wherein the one or more indicators of the one or more classification or forwarding decisions include types indicating route, drop, central processing unit (CPU) copy, redirect, learn, egress minor, and ingress mirror.

23. The system of claim 17, wherein the one or more indicators in compressed form represent Access Control List (ACL) types.

24. The system of claim 17, wherein the second logic is operable to decompress the one or more indicators for each of the one or more first and second matching entries.

25. The system of claim 17, wherein the first and second CAM systems are different.

26. The system of claim 17, wherein the first and second CAM systems are the same.

27. The system of claim 26, wherein the first and second CAM keys are of different types.

28. The system of claim 27, wherein the first and second CAM keys are of different types as indicated by a type field included in each.

29. The system of claim 28, wherein the one or more first matching CAM entries and the one or more second CAM entries are of different types as indicated by a type field in the key portion of each.

30. The system of claim 28, further comprising an additional CAM system, having a CAM and an associated RAM, to perform one or more additional CAM accesses resulting in one or more additional matching CAM entries, each of the one or more additional matching CAM entries including a content portion retrieved from the associated RAM,
wherein the second logic is operable to determine the classification or forwarding decision for the packet responsive to the content portion of each of the one or more first, second, and additional matching CAM entries.

31. The system of claim 16, wherein the first logic is operable to derive the first CAM key from one or more first packet fields, and is operable to derive the second CAM key from one or more second packet fields, each distinct from the one or more first packet fields.

32. The system of claim 16, wherein the first logic is operable to set the first and second CAM keys to sizes that are each smaller than a maximum allowable CAM key size applicable to the first and second CAM systems.

33. The system of claim 19, wherein the second logic is operable to logically combine the bit maps via a logical AND operation.

* * * * *